(12) United States Patent
Huang et al.

(10) Patent No.: US 10,518,215 B2
(45) Date of Patent: Dec. 31, 2019

(54) METHOD FOR ADSORBING ETHYLENE GAS USING AMORPHOUS GRANULAR STARCH

(71) Applicant: South China University of Technology, Guangzhou (CN)

(72) Inventors: Qiang Huang, Guangzhou (CN); Linfan Shi, Guangzhou (CN); Bin Zhang, Guangzhou (CN); Xiong Fu, Guangzhou (CN)

(73) Assignee: South China University of Technology, Guangzhou, Guangdong (CN)

( * ) Notice: Subject to any disclaimer, the term of this patent is extended or adjusted under 35 U.S.C. 154(b) by 0 days.

(21) Appl. No.: 16/092,493

(22) PCT Filed: Nov. 9, 2017

(86) PCT No.: PCT/CN2017/110101
§ 371 (c)(1),
(2) Date: Oct. 10, 2018

(87) PCT Pub. No.: WO2018/095220
PCT Pub. Date: May 31, 2018

(65) Prior Publication Data
US 2019/0160426 A1 May 30, 2019

(30) Foreign Application Priority Data
Nov. 22, 2016 (CN) .......................... 2016 1 1026370

(51) Int. Cl.
*B01D 53/81* (2006.01)
*A23B 7/152* (2006.01)
(Continued)

(52) U.S. Cl.
CPC ............... *B01D 53/81* (2013.01); *A23B 7/00* (2013.01); *A23B 7/152* (2013.01); *B01D 53/02* (2013.01);
(Continued)

(58) Field of Classification Search
None
See application file for complete search history.

(56) References Cited

FOREIGN PATENT DOCUMENTS

| CN | 1346832 A | 5/2002 |
|----|-----------|--------|
| CN | 1494381 A | 5/2004 |

(Continued)

*Primary Examiner* — Anita Nassiri-Motlagh
(74) *Attorney, Agent, or Firm* — The Dobrusin Law Firm, PC

(57) ABSTRACT

The invention discloses a method for adsorbing ethylene gas using amorphous granular starch. The method firstly prepares amorphous granular starch, wherein starch slurry is prepared from starch with a ethanol aqueous solution and NaOH solution is added dropwise so as to react at 30 to 35° C. for 20 to 50 minutes; Then the slurry is centrifuged, neutralized with an ethanol hydrochloride solution, washed and dried to obtain the amorphous granular starch. The amorphous granular starch is placed in a high-pressure reactor and ethylene gas is introduced after the reactor is vacuumized to react at 0.8 to 1.5 Mpa and 20 to 30° C. for 15 to 25 h so that starch powder product adsorbing with ethylene is obtained. The test result shows that the content of ethylene in the obtained product can reach more than 30%. The method is simple, highly efficient and cheap for the adsorption process of ethylene, and the product is expected to be widely applied in the field of fruit and vegetable modified atmosphere preservation.

10 Claims, 1 Drawing Sheet

(51) Int. Cl.
*B01D 53/72* (2006.01)
*C08J 3/12* (2006.01)
*C08B 31/00* (2006.01)
*C08B 30/06* (2006.01)
*B01D 53/02* (2006.01)
*B01J 20/24* (2006.01)
*A23B 7/00* (2006.01)
*C08B 30/12* (2006.01)
*B01J 20/30* (2006.01)

(52) U.S. Cl.
CPC .............. *B01D 53/72* (2013.01); *B01J 20/24* (2013.01); *B01J 20/3085* (2013.01); *C08B 30/06* (2013.01); *C08B 30/12* (2013.01); *C08B 31/00* (2013.01); *C08J 3/12* (2013.01); *A23V 2002/00* (2013.01); *B01D 2253/20* (2013.01); *B01D 2257/7022* (2013.01); *B01D 2259/455* (2013.01); *B01D 2259/4525* (2013.01); *B01J 2220/4825* (2013.01); *C08J 2303/02* (2013.01); *C08J 2303/04* (2013.01)

(56) References Cited

FOREIGN PATENT DOCUMENTS

| CN | 1884347 A | 12/2006 |
| CN | 101012283 A | 8/2007 |
| CN | 101708460 A | 5/2010 |
| CN | 101824165 A | 9/2010 |
| CN | 103113475 A | 5/2013 |

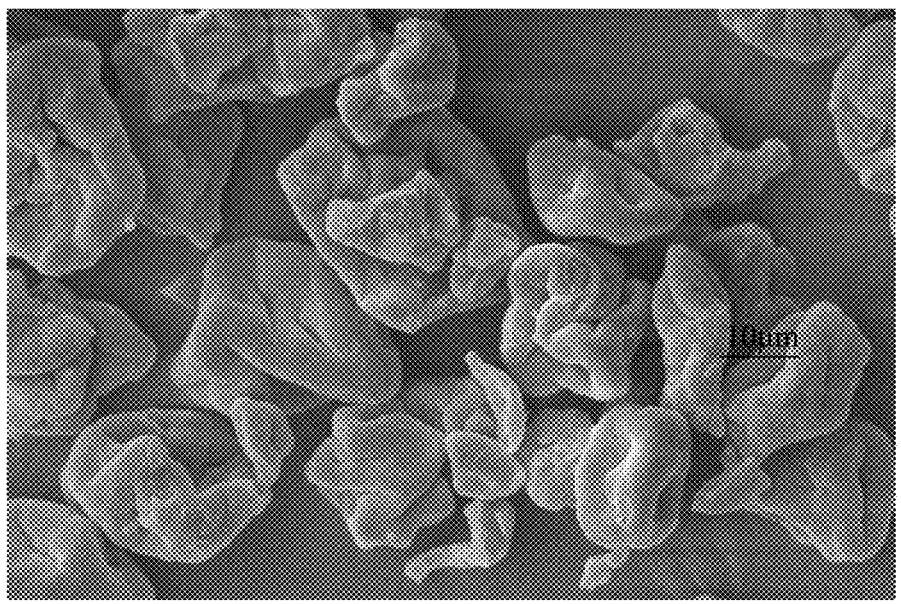

METHOD FOR ADSORBING ETHYLENE GAS USING AMORPHOUS GRANULAR STARCH

TECHNICAL FIELD OF THE INVENTION

The present invention relates to an adsorption method for ethylene gas, specifically to a method for adsorbing ethylene gas using amorphous granular starch. The method relates to the encapsulation of ethylene gas and belongs to the field of food and chemical engineering.

BACKGROUND OF THE INVENTION

Modified atmosphere storage is to place the fruits and vegetables in a relatively closed environment. By adjusting the concentration of gas around the fruits and vegetables to control their respiration effectively, the purpose of delaying the deterioration of fruits and vegetables or regulating the ripening of fruits can be achieved. According to statistics, the decay rate of fruits and vegetables due to improper storage reaches 20%-30% annually, which ranks first in the world and results in economic losses of up to 75 billion RMB. Only 20% of the total output of fruits and vegetables in China are stored after being harvested, and the fruits and vegetables stored with modified atmosphere are less than 1% of the total output, which is far from the average post-harvest storage percentage of 80% in developed countries.

Gases are usually stored and transported in high-pressure-resistant steel cylinders, but there is a risk of leakage and explosion during use. The adsorption of gas into solid matrices can avoid such defects effectively, wherein the gas physically captured in solid matrices has characteristics such as slow release, which is an important application if small amount and continuous possession are necessary. For example, in the storage and transportation process after harvesting bananas or apples, the solid powder matrices adsorbing with ethylene gas can be placed in a warehouse or transport vehicle so that the slowly released ethylene gas can ripen the fruit in a period of time to regulate the ripening time of fruits.

Ethylene is an important gas for regulation of plant maturation, which is known as "plant hormone" and can accelerate fruit ripening or promote seed germination (such as mung bean). In the field of vegetable and fruit preservation, ethephon is widely used to induce the release of ethylene from plants or fruits, but it is to some extent toxic, whose safety has attracted much attention.

At present, the adsorption of ethylene gas by cyclodextrin has been reported, and the preparation method is mostly liquid phase method. A saturated solution is prepared from cyclodextrin powder and placed in a high-pressure reactor. Then ethylene is introduced and the reaction begins at 25° C. for 120 h. After washing and drying, cyclodextrin sample adsorbing with ethylene is obtained. The recovery rate of the sample is 15% to 40%, and the adsorption rate of ethylene is 2.3% to 2.8% (Ho, B T, Joyce, D C, Bhandari, B R (2011), Encapsulation of ethylene gas into α-cyclodextrin and characterization of the inclusion complex, Food Chemistry, 127, 572-580). However, cyclodextrin used in the method is expensive, the adsorption process is complicated with a low sample recovery rate and ethylene adsorption rate, which makes it not suitable for large-scale production in food industry.

SUMMARY OF THE INVENTION

The object of the present invention is to provide a method for adsorbing ethylene gas using amorphous granular starch, which is cheap, simple in operation, and greatly improves the sample recovery rate and adsorption rate of ethylene gas.

In the invention, the starch granules are processed into amorphous granular starch by the alcoholic-alkaline treatment, wherein the double helix structure in the starch is uncoiled by NaOH, and at the same time, ethanol solution can restrict the swelling of the particles, thereby maintaining the integrity of the particles. During the process, the starch molecule forms a V-type single helix structure complex with ethanol. Ethanol volatilizes during the drying process, and cavities are formed in the single helix structure of the starch particles. The hydrophobic cavity of the amorphous granular starch facilitates the entry of non-polar gases, which can achieve the purpose of adsorbing ethylene. The invention uses amorphous granular starch as encapsulating material to adsorb ethylene, and has the characteristics of simple process and low cost. Particularly, the recovery rate of the product and the adsorption amount of ethylene in the invention are significantly improved compared with the prior art. In general, in the invention, the amorphous granular starch is used to adsorb ethylene, the preparation process is simple and quick, the cost is low, the sample recovery rate and the ethylene adsorption rate are high, which provides a new choice and possibility for novel food preservation technology and develops the present gas adsorption and encapsulation technology.

The purpose of the present invention is realized by the following technical scheme:

A method for adsorbing ethylene gas using amorphous granular starch, comprising the following steps:

(1) preparation of amorphous granular starch:

a) pulping: pulping with an ethanol aqueous solution to obtain a starch slurry with a dry basis mass fraction of 10% to 15%;

b) reaction: keeping the starch slurry obtained in step a) in a water bath with constant temperature of 25~40° C., adding a NaOH solution dropwise and stirring to react for 20~60 min;

c) neutralization: centrifuging the starch slurry obtained in step b), washing with ethanol solution, neutralizing with an ethanol hydrochloride solution, centrifuging and washing with ethanol;

d) drying: drying and sieving the starch obtained in step c) to obtain the amorphous granular starch;

(2) adsorption of ethylene by amorphous granular starch: placing the amorphous granular starch in a high-pressure reactor, wherein the amount of the starch is 20%~30% of the reactor's volume; vacuumizing the reactor and flushing with ethylene gas under the condition of 0.8~1.5 Mpa and 20~30° C. for 15~25 h; after the reaction is completed, opening the gas outlet valve, absorbing the unadsorbed ethylene to obtain a starch powder product adsorbing with ethylene.

To further achieve the purpose of the invention, preferably raw starch in the starch slurry is selected from corn starch, tapioca starch or potato starch. More preferably, the corn starch is selected from normal corn starch or high-amylose corn starch (Hylon-5 and Hylon-7).

Preferably, the concentration of the NaOH solution is 1-5 mol/L, and the mass ratio of the dry starch basis to the NaOH solution is 1:1-1:10.

Preferably, the NaOH solution is added dropwise at a speed of 2-6 g/min.

Preferably, the concentration of the ethanol aqueous solution is 30%-50% by mass; the concentration of the ethanol solution used in said washing with ethanol solution is 70%-90% by mass; the said washing with ethanol solution refers to washing the starch with the ethanol solution and absolute ethanol separately; the number of times of said washing with the ethanol solution and absolute ethanol is 1-4.

Preferably, the concentration of the ethanol hydrochloride solution is 1-5 mol/L.

Preferably, the speed of the stirring is 80-120 rpm with a centrifugal force of 1811×g.

Preferably, the said drying refers to drying the starch obtained in step c) in an oven under the temperature of 40-60° C. for 1-3 h; the said sieving refers to sieving through 120-200 mesh sieve.

Preferably, the unadsorbed ethylene is absorbed by bromine water; the vacuum degree is −0.01 to −0.10 Mpa in said vacuumizing the reactor.

Compared with the prior art, the invention has the following advantages:

1) The method can increase the adsorption rate of ethylene significantly. The adsorption rate of ethylene is 2.0~2.9% (w/w) using cyclodextrin, while the adsorption rate of ethylene in the invention is ≥30% (w/w), wherein the product is soluble in cold water.

2) The invention uses a solid encapsulation method, which is fast, time saving, highly efficient and large in encapsulation quantity compared with the traditional liquid phase encapsulation method. The liquid phase encapsulation method is usually carried out in an aqueous medium, wherein the reaction time is more than 72 hours, and the sample recovery rate is less than 45%. The reaction time of the solid encapsulation method is generally 15 to 25 h, and the sample recovery rate is 100%.

3) Compared with the existing ethylene adsorption method, the adsorption material in the method of the invention is cheap, easy to obtain and has wide sources, meantime the required equipment and the preparation process of the method of the invention are simple.

BRIEF DESCRIPTION OF THE DRAWINGS

FIG. 1 is the SEM image of the amorphous granular starch adsorbing with ethylene in embodiment 1.

DETAILED DESCRIPTION OF THE PREFERRED EMBODIMENTS

For better understanding of the present invention, the present invention will be further described with the following embodiments, but the scope of the invention is not limited to the embodiments.

In the embodiments, the method for determining the ethylene content of the product is as follows: weigh 20 mg of the product accurately in a 20 mL headspace vial, add 1 mL of distilled water, and quickly tighten the cap. After magnetic stirring at 600 rpm for 5 min, determine the ethylene content by headspace gas chromatography. Then convert the peak area of ethylene to ethylene concentration based on ethylene standard. Since ethylene is slightly soluble in water, the total ethylene content consists of two parts: ethylene for the headspace gas test and ethylene dissolved in water. Ethylene dissolved in water is calculated using Henry's law:

$$C_w = 0.119 \times C_h \quad (1)$$

$$Y = C_w + C_h \quad (2)$$

Comparative Embodiment 1

The prior art uses cyclodextrin to adsorb ethylene: a saturated solution was prepared by cyclodextrin at 25° C., placed in a reactor. After the reactor was vacuumized, ethylene gas was introduced at 1.5 MPa to react for 120 h. After the reaction was completed, the sample was vacuum filtered to obtain cyclodextrin adsorbing with ethylene, which was dried to a constant weight at room temperature, packaged in a sealed bag, and stored in a dry, low temperature, dark environment.

The test result shows that the recovery rate of the sample was 40%, and the adsorption rate of ethylene was 2.5% (w/w).

Embodiment 1

A method for adsorbing ethylene gas using amorphous granular starch, comprising the following steps:

(1) preparation of amorphous granular starch:

a) pulping: pulping the normal corn starch with ethanol aqueous solution (40%, w/w) to obtain a starch slurry with a dry basis mass fraction of 12%;

b) reaction: keeping the starch slurry obtained in step a) in a water bath with constant temperature of 35° C., adding 3 mol/L NaOH solution dropwise at a speed of 5 g/m in and stirring to react for 20 min, wherein the mass ratio of the starch and the NaOH solution is 1:4;

c) neutralization: centrifuging the starch slurry obtained in step b) with a centrifugal force of 1811×g, washing with ethanol solution (40%, w/w) for two times, neutralizing with 3 mol/L ethanol hydrochloride solution, centrifuging and washing with ethanol (95%, w/w) for one time followed by washing with absolute ethanol for another one time;

d) drying: drying the starch obtained in step c) at 60° C. in an oven for 5 h and sieving with a 150 mesh sieve to obtain the amorphous granular starch;

(2) adsorption of ethylene by amorphous granular starch: placing the amorphous granular starch in a high-pressure reactor, wherein the amount of the starch is 20% of the reactor's volume; vacuumizing the reactor to a vacuum degree of −0.1 MPa and introducing ethylene gas under the condition of 1.0 Mpa and 25° C. to react for 24 h; after the reaction is completed, opening the gas outlet valve, absorbing the unadsorbed ethylene to obtain a starch powder product adsorbing with ethylene.

The test result shows that the recovery rate of the sample was 100%, and the adsorption rate of ethylene was 13.8% (w/w).

FIG. 1 is the SEM image of the amorphous granular starch adsorbing with ethylene obtained in embodiment 1. The sample was fixed on the sample stage with conductive glue, placed in an ion sputtering apparatus for gold spraying, and photographed by a QUANTA 200 SEM. Compared with the original starch, the particle has changed greatly in morphology. The starch granules have expanded under alkaline condition and thus increased in size. But still, the starch powder stage was remained, which is beneficial to product dispersion and packaging.

In the comparative embodiment, the complexation between ethylene and cyclodextrin occurs on the surface of the solution, depending on the natural convection of ethylene and cyclodextrin molecules at the interface. The interaction among the molecules in this reaction is weak, so that the process is time consuming, while the sample recovery rate and ethylene adsorption rate are low. Compared with comparative embodiment 1, the sample recovery rate and the ethylene adsorption rate of the method of embodiment 1 were greatly improved. After the starch granules were treated with alkali, the double helix unwound, and the cavity inside the single helix was hydrophobic, which can adsorb non-polar gas ethylene to form a V-type structure complex. Under a certain pressure, the interfacial interaction between ethylene molecules and the cavity inside the amorphous granular starch promoted the entry of ethylene molecules so that ethylene gas was entrapped. Since the reaction did not involve moisture, the recovery rate of the sample was 100%. The sample obtained in this embodiment can release the entrapped ethylene gas slowly under certain temperature and humidity, and can be used for ripening of fruits (such as bananas, apples, and mangoes), thereby achieving the purpose of regulating ripening time of fruits.

Embodiment 2

A method for adsorbing ethylene gas using amorphous granular starch, comprising the following steps:

(1) preparation of amorphous granular starch:

a) pulping: pulping the potato starch with ethanol aqueous solution (40%, w/w) to obtain a starch slurry with a dry basis mass fraction of 12%;

b) reaction: keeping the starch slurry obtained in step a) in a water bath with constant temperature of 35° C., adding 3 mol/L NaOH solution dropwise at a speed of 5 g/m in and stirring to react for 20 min, wherein the mass ratio of the starch and the NaOH solution is 1:3.5;

c) neutralization: centrifuging the starch slurry obtained in step b) with a centrifugal force of 1811×g, washing with ethanol solution (40%, w/w) for two times, neutralizing with 3 mol/L ethanol hydrochloride solution, centrifuging and washing with ethanol (95%, w/w) for one time followed by washing with absolute ethanol for another one time;

d) drying: drying the starch obtained in step c) at 60° C. in an oven for 5 h and sieving with a 150 mesh sieve to obtain the amorphous granular starch;

(2) adsorption of ethylene by amorphous granular starch: placing the amorphous granular starch in a high-pressure reactor, wherein the amount of the starch is 20% of the reactor's volume; vacuumizing the reactor to a vacuum degree of −0.10 MPa and introducing ethylene gas under the condition of 1.1 Mpa and 25° C. to react for 24 h; after the reaction is completed, opening the gas outlet valve, absorbing the unadsorbed ethylene to obtain a starch powder product adsorbing with ethylene.

The test result shows that the recovery rate of the sample was 100%, and the adsorption rate of ethylene was 12.8% (w/w).

Embodiment 3

A method for adsorbing ethylene gas using amorphous granular starch, comprising the following steps:

(1) preparation of amorphous granular starch:

a) pulping: pulping the high amylose corn starch (Hylon-5) with ethanol aqueous solution (40%, w/w) to obtain a starch slurry with a dry basis mass fraction of 12%;

b) reaction: keeping the starch slurry obtained in step a) in a water bath with constant temperature of 35° C., adding 3 mol/L NaOH solution dropwise at a speed of 5 g/m in and stirring to react for 30 min, wherein the mass ratio of the starch and the NaOH solution is 1:5;

c) neutralization: centrifuging the starch slurry obtained in step b) with a centrifugal force of 1811×g, washing with ethanol solution (40%, w/w) for two times, neutralizing with 3 mol/L ethanol hydrochloride solution, centrifuging and washing with ethanol (95%, w/w) for one time followed by washing with absolute ethanol for another one time;

d) drying: drying the starch obtained in step c) at 60° C. in an oven for 6 h and sieving with a 150 mesh sieve to obtain the amorphous granular starch;

(2) adsorption of ethylene by amorphous granular starch: placing the amorphous granular starch in a high-pressure reactor, wherein the amount of the starch is 20% of the reactor's volume; vacuumizing the reactor to a vacuum degree of −0.10 MPa and introducing ethylene gas under the condition of 1.2 Mpa and 25° C. to react for 24 h; after the reaction is completed, opening the gas outlet valve, absorbing the unadsorbed ethylene to obtain a starch powder product adsorbing with ethylene.

The test result shows that the recovery rate of the sample was 100%, and the adsorption rate of ethylene was 23.8% (w/w).

Embodiment 4

A method for adsorbing ethylene gas using amorphous granular starch, comprising the following steps:

(1) preparation of amorphous granular starch:

a) pulping: pulping the high amylose corn starch (Hylon-7) with ethanol aqueous solution (40%, w/w) to obtain a starch slurry with a dry basis mass fraction of 12%;

b) reaction: keeping the starch slurry obtained in step a) in a water bath with constant temperature of 35° C., adding 3 mol/L NaOH solution dropwise at a speed of 5 g/m in and stirring to react for 30 min, wherein the mass ratio of the starch and the NaOH solution is 1:8;

c) neutralization: centrifuging the starch slurry obtained in step b) with a centrifugal force of 1811×g, washing with ethanol solution (40%, w/w), neutralizing with 3 mol/L ethanol hydrochloride solution, centrifuging and washing with ethanol (95%, w/w) for one time followed by washing with absolute ethanol for another one time;

d) drying: drying the starch obtained in step c) at 60° C. in an oven for 6 h and sieving with a 150 mesh sieve to obtain the amorphous granular starch;

(2) adsorption of ethylene by amorphous granular starch: placing the amorphous granular starch in a high-pressure reactor, wherein the amount of the starch is 20% of the reactor's volume; vacuumizing the reactor to a vacuum degree of −0.10 MPa and introducing ethylene gas under the condition of 1.2 Mpa and 25° C. to react for 24 h; after the reaction is completed, opening the gas outlet valve, absorbing the unadsorbed ethylene to obtain a starch powder product adsorbing with ethylene.

The test result shows that the recovery rate of the sample was 100%, and the adsorption rate of ethylene was 31.8% (w/w).

Starch is a large-scale industrial raw material, whose price is about one tenth of that of cyclodextrin. Therefore, the present invention is advantageous in raw material cost; in addition, the present invention uses solid encapsulation method. Compared with the traditional liquid phase encapsulation method carried out by cyclodextrin, the present encapsulation method is fast, time-saving, highly efficient and large in encapsulation quantity. The liquid phase embedding method is usually carried out in an aqueous medium, the reaction time is more than 72 h, and the product recovery rate is less than 45%. The reaction time of the solid embedding method is generally 15 to 25 h, and the product recovery rate is 100%.

What is claimed is:

1. A method for adsorbing ethylene gas using amorphous granular starch, comprising the following steps:

(1) preparation of an amorphous granular starch comprising:
  (a) pulping with an ethanol aqueous solution to obtain a starch slurry with a dry basis mass fraction of 10% to 15%;
  (b) keeping the starch slurry obtained in step (a) in a water bath with constant temperature of 25-40° C., adding a NaOH solution dropwise, and stirring to react for 20-60 min;
  (c) centrifuging the starch slurry obtained in step (b) to obtain a first solid and a first liquid, washing the first solid with ethanol solution, neutralizing the first solid with an ethanol hydrochloride solution, centrifuging to obtain a second solid and a second liquid, and washing the second solid with ethanol solution to obtain a treated starch; and
  (d) drying and sieving the treated starch obtained in step (c) to obtain the amorphous granular starch; and
(2) adsorption of ethylene by the amorphous granular starch comprising:
  (a) placing the amorphous granular starch in a high-pressure reactor, wherein the amount of the amorphous granular starch is 20%-30% of the reactor's volume;
  (b) vacuumizing the reactor and then flushing the reactor with the ethylene gas under the condition of 0.8-1.5 Mpa and 20-30° C. to react for 15-25 h; and
  (c) after a reaction between the amorphous granular starch and the ethylene gas is completed, opening a gas outlet valve and removing unadsorbed ethylene to obtain a starch powder product which has adsorbed the ethylene.

2. The method for adsorbing ethylene gas using amorphous granular starch as claimed in claim 1, wherein raw starch in the starch slurry is selected from corn starch, tapioca starch or potato starch.

3. The method for adsorbing ethylene gas using amorphous granular starch as claimed in claim 2, wherein the corn starch is selected from normal corn starch or High-amylose corn starch (Hylon-5 and Hylon-7).

4. The method for adsorbing ethylene gas using amorphous granular starch as claimed in claim 1, wherein a concentration of the NaOH solution is 1-5 mol/L, and a mass ratio of the dry starch basis to the NaOH solution is 1:1-1:10.

5. The method for adsorbing ethylene gas using amorphous granular starch as claimed in claim 1, wherein the NaOH solution is added dropwise at a speed of 2-6 g/min.

6. The method for adsorbing ethylene gas using amorphous granular starch as claimed in claim 1, wherein the concentration of the ethanol aqueous solution is 30%-50% by mass; the concentration of the ethanol solution used in said washing with ethanol solution is 70%-90% by mass; the said washing with ethanol solution refers to washing the starch with the ethanol solution and absolute ethanol separately; and the number of times of said washing with the ethanol solution and absolute ethanol is 1-4.

7. The method for adsorbing ethylene gas using amorphous granular starch as claimed in claim 1, wherein a concentration of the ethanol hydrochloride solution is 1-5 mol/L.

8. The method for adsorbing ethylene gas using amorphous granular starch as claimed in claim 1, wherein a speed of the stirring is 80-120 rpm with a centrifugal force of 1811×g.

9. The method for adsorbing ethylene gas using amorphous granular starch as claimed in claim 1, wherein the drying refers to drying the starch obtained in step (c) in an oven under a temperature of 40-60° C. for 1-3 h; and wherein the sieving refers to sieving through a 120-200 mesh sieve.

10. The method for adsorbing ethylene gas using amorphous granular starch as claimed in claim 1, wherein the unadsorbed ethylene is removed by bromine water, and the vacuum degree is −0.01 to −0.10 MPa in the step of vacuumizing the reactor.

* * * * *